United States Patent
Martin et al.

(10) Patent No.: US 7,908,599 B2
(45) Date of Patent: Mar. 15, 2011

(54) DYNAMIC GRANTING OF PERMISSIONS IN AN OBJECT-ORIENTED CODE BASE

(75) Inventors: Brian Keith Martin, Cary, NC (US); Jian Tang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 11/335,767

(22) Filed: Jan. 19, 2006

(65) Prior Publication Data

US 2007/0169071 A1    Jul. 19, 2007

(51) Int. Cl.
*G06F 9/44* (2006.01)
(52) U.S. Cl. ........................................ 717/166
(58) Field of Classification Search .................. 717/166; 726/1, 3, 8, 80; 707/10, 102, 201; 713/167, 713/176; 709/202, 221
See application file for complete search history.

(56) References Cited

U.S. PATENT DOCUMENTS

| 7,418,718 B2* | 8/2008 | Liu et al. ........................ 719/328 |
| 7,565,533 B2* | 7/2009 | Scheifler et al. .............. 713/167 |
| 2003/0154265 A1* | 8/2003 | Raffaele et al. ............... 709/221 |
| 2004/0025060 A1* | 2/2004 | Raffaele et al. ............... 713/202 |
| 2007/0061795 A1* | 3/2007 | Atsatt ........................... 717/166 |

OTHER PUBLICATIONS http://www.javaworld.com/javaworld/jw-10-indepth.html, "The basics of Java class loaders" by Chuck McManis, Dec. 6, 2005, pp. 1-8.

* cited by examiner

*Primary Examiner* — Tuan Anh Vu
(74) *Attorney, Agent, or Firm* — Wood, Herron & Evans LLP

(57) ABSTRACT

An apparatus, program product and method are capable of dynamically assigning different code base identifiers to different classes defined in the same code base during class load operations to enable different code base-correlated policies to be assigned to such classes, thereby effectively granting different access permissions to classes that are defined within the same code base.

20 Claims, 2 Drawing Sheets

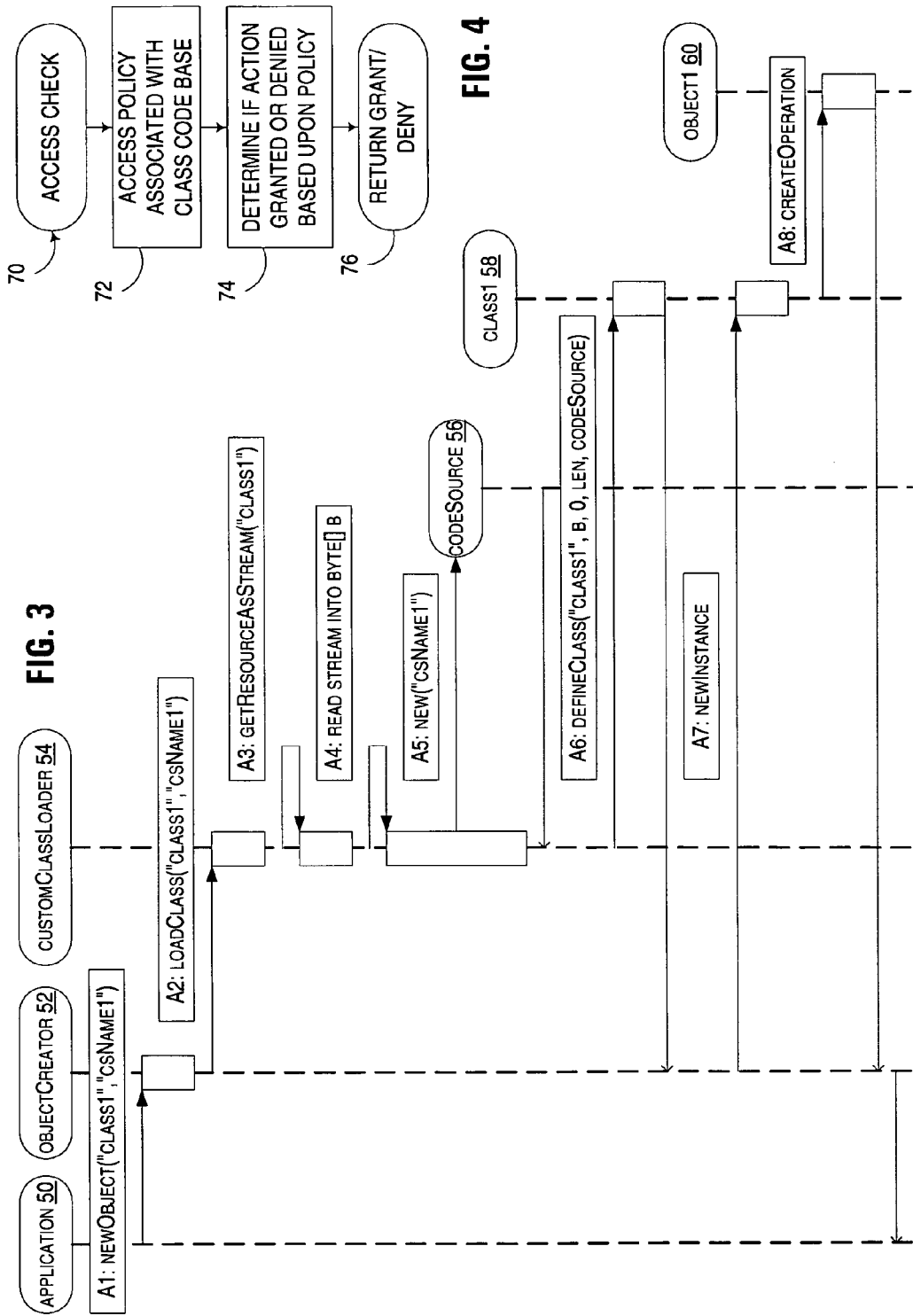

US 7,908,599 B2

DYNAMIC GRANTING OF PERMISSIONS IN AN OBJECT-ORIENTED CODE BASE

FIELD OF THE INVENTION

The invention relates to computers and computer software, and in particular, to granting access permissions in an object-oriented computer program.

BACKGROUND OF THE INVENTION

As computers have become more integral to contemporary society, the risks of information theft, malicious attacks and the like have increased. As a result, significant efforts have been devoted to improving computer security.

For example, most modern operating systems and runtime environments implement some form of a security architecture that limits the types of operations that certain users and certain programs can perform in a computer, e.g., operations such as reading certain data, writing certain data, executing certain programs, etc. Often, such security architectures rely on policies that apply to users, programs and other entities, and define the permissions or rights that have been granted to such entities.

The JAVA programming environment, in particular, has a significant concern for controlling security due to the portable nature of JAVA programs. JAVA is a type of object-oriented programming language where a JAVA program, e.g., a JAVA application or JAVA applet, is defined by one or more classes that define templates for the objects that are created during the execution of a JAVA application or applet. JAVA employs a write once, run anywhere approach where a JAVA program that is compiled into a platform independent format commonly known as byte code can be deployed and installed into any computer having a compatible JAVA virtual machine (JVM) runtime environment. As a result, JAVA programs are frequently distributed over the Internet or another network to large numbers of users, and are potential vehicles for malicious attacks by third parties.

JAVA defines a security architecture that generally maps a set of permissions to a JAVA program based upon a policy defined for the program. One limitation that has been encountered in connection with the JAVA security architecture, however, is that each policy is correlated with an entire code base, or code source, such that all of the classes in a particular code base will be granted the same access permissions. Put another way, code bases define the basic protection domains for the JAVA security architecture, and as a result, policies are code base-correlated.

A code base, in this context, is a collection of related classes from a JAVA program. Compilation of a JAVA program into a byte code format typically results in the generation of individual class files for each compiled class. Often, to facilitate the distribution of a JAVA program, all of the class files therefor are bundled together in a single, compressed file, referred to as a JAVA Archive (JAR) file. For the purposes of JAVA security, an entire JAR file forms a single code base, and thus a single protection domain. As a result, all of the classes in a given JAR file are conventionally mapped to the same policy and granted the same access permissions by the JAVA security architecture.

To grant different access permissions to different classes in a JAVA program, a developer typically must place the classes in different JAR files, and assign separate policies to the different JAR files. However, it is typically desirable to limit a JAVA program to a single JAR file whenever possible to facilitate easy distribution. As a result, a need has arisen in the art for a manner of enabling different classes in a JAVA program to be granted different access permissions without requiring those classes to be split up into multiple JAR files.

Furthermore, another limitation encountered with the JAVA security architecture is the static nature of the access permissions applied to a JAVA program. In a conventional JAVA environment, for example, policies are created during development. As of deployment or installation time, i.e., whenever a JAVA program is installed into a runtime environment, the access permissions for a given JAVA program are static and immutable. Consequently, a JAVA program will typically be granted the same access permissions regardless of the specific environment within which the program is installed. In some applications, however, it may be desirable to adjust the access permissions of a JAVA program to accommodate specific characteristics of a given environment. A need therefore has also arisen for a manner of enabling access permissions for a JAVA program to be modifiable to better accommodate different environments.

SUMMARY OF THE INVENTION

The invention addresses these and other problems associated with the prior art by providing an apparatus, program product and method that are capable of dynamically assigning different code base identifiers to different classes defined in the same code base during class load operations to enable different code base-correlated policies to be assigned to such classes, thereby effectively granting different access permissions to classes that are defined within the same code base.

Among other benefits, the assignment of different code base identifiers to classes in a given code base enables the definition of the access permissions to various classes in an object-oriented program to be decoupled from the arrangement of classes in code base. Furthermore, in some embodiments consistent with the invention, by assigning code base identifiers during class load operations, access permissions for a program may be configurable at runtime, rather than having to be defined during deployment or installation of a program.

Therefore, consistent with one aspect of the invention, an object-oriented program code defined in a code base identified by a first code base identifier may be executed, and during a class load of a class defined in the code base for the object-oriented program code, a second code base identifier may be assigned to the class, where the second code base identifier differs from the first code base identifier for the code base within which the class is defined. An access permission may then be determined for an instance of the class by accessing a policy associated with the second code base identifier.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a sequence diagram illustrating a class load operation performed by the apparatus of FIG. 1.

FIG. 4 is a flowchart illustrating the program flow of an access check routine performed by the apparatus of FIG. 1.

DETAILED DESCRIPTION

Figure 1:
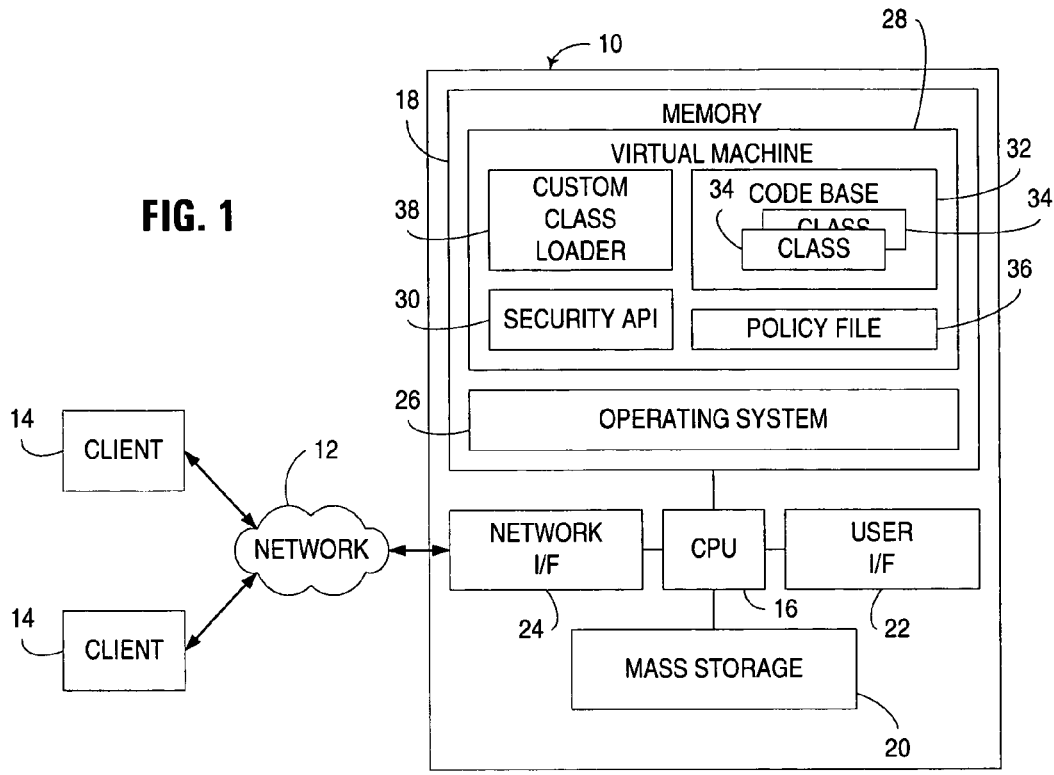
FIG. 1 is a block diagram of the principal hardware components in an apparatus suitable for implementing dynamic permission granting consistent with the invention.

The embodiments discussed hereinafter enable different code base identifiers to be dynamically assigned to different classes defined in the same code base during class load operations to enable different code base-correlated policies to be assigned to such classes, thereby effectively granting different access permissions to classes that are defined within the same code base. In this regard, a code base may be considered to be any collection of classes in an object-oriented program for which a policy can be defined.

In the embodiments discussed in greater detail below, for example, a code base may take the form of a JAVA Archive (JAR) file, where the JAVA classes in the JAR file are typically granted the same access permissions by the JAVA 2 Platform Security Architecture. In the JAVA programming environment, a code base may also be referred to as a code source, which typically identifies both the location and any certificates used to verify the code originating from that location. Within the context of the invention, however, the terms code base and code source may be considered to be interchangeable with one another, and as a result a code source name, which is typically used to identify the code base for a class in JAVA 2 security, may be considered to be a code base identifier. It will also be appreciated that while the embodiments discussed below focus on a specific application in the JAVA programming environment, the invention is not limited to the JAVA programming environment, and may be utilized in other programming environments consistent with the invention. Furthermore, a code base identifier need not be limited to an alphanumeric name, but instead may be implemented using any form of identifier that can be used to uniquely identify a code base.

When JAVA 2 security is enabled, operations that require JAVA permissions are conventionally checked against the policy associated with the code base. For example, to grant full permission to code base such as a JAR file named "c:/was/lib/server1.jar," and consequently to all classes in that code base, a JAVA 2 compatible policy may take the form shown in Table I:

TABLE I grant codebase "c:/was/lib/server1.jar" {
    Permission java.security.AllPermission;
};

It has been found, however, that under some scenarios, JAVA 2 places inordinate limitations on a developer's ability to implement a desired security implementation. In one scenario, it may be desirable to provide some classes in a JAR file with certain permissions in a certain configuration, while in another configuration a different set of permissions may need to be used. For example, the class FileWriteOperation is a class used to write contents to some files. It may be desirable in some environments to enable all files in the environment to be written to, while in other environments it may be desirable to enable only limited files to be written. Under JAVA 2 security, changing the permissions to accommodate a particular environment is typically not possible without performing explicit checking of which files can be written to during runtime; however, this procedure would need to be performed outside of JAVA 2 security.

In another scenario, it may be desirable to use the principal-based JAVA Authentication and Authorization Service (JAAS) for some classes in a JAR file. On the other hand, it may be necessary or desirable to deploy a JAR file with all permissions granted, e.g., if the JAR file is deployed as a library in a application server. Under the JAVA programming environment, the granting of all permissions to a JAR file will override JAAS authorization, and as a result effectively disable JAAS authorization for all of the classes in the JAR file. This limitation can be overcome by separating out the specific classes requiring JAAS authorization into a separate JAR file, but with the disadvantage of increasing the number of JAR files for a JAVA program. In addition, where a policy is established to grant permissions to all JAR files in a particular directory and/or its subdirectories, JAR files that rely on JAAS authorization may need to be installed into different directories to prevent JAAS authorization from being overridden, thus further complicating installation of the program.

Embodiments consistent with the invention address these limitations by dynamically assigning a code base identifier to a class during a class load operation to enable a code base-correlated policy to be applied to the class without concern for the policy that is applied to the code base within which the class is provided. In the embodiments described hereinafter, for example, a custom secure class loader is used to assign a code base identifier taking the form of a custom code source name when loading a class. Therefore, the original policy for the JAR file from which the class is loaded will not apply to this class any more because the class is not considered to be loaded from the original JAR file. A different policy may thus be defined to grant the new custom code source name with certain permissions.

During runtime, the custom secure class loader may also be used to decide which among several code source names to use when loading a class. As such, during deploy time, a deployer is able to decide what permissions should be granted to the custom code sources used to load those classes, thereby permitting permissions to be granted to a class dynamically without runtime code changes.

Revisiting the aforementioned scenarios, it will be appreciated how the dynamic permission granting supported by the herein-described embodiments is able to handle these scenarios in a superior manner to conventional JAVA 2 security. In particular, for the first scenario, where it is desirable to grant different permissions to a FileWriteOperation class when deployed to different environments, a policy file may be defined with two policies for the custom code source names "/FileWriteOperationAll" and "/FileWriteOperationLimited." Then, during runtime, when class FileWriteOperation is loaded, a custom secure class loader may be used to check a configuration parameter during the class load and assign the appropriate custom code source name. If the setting is "all", for example, "/FileWriteOperationAll" may be used as the custom code source name. If the setting is "Limited", "/FileWriteOperationLimited" may instead be used as the custom code source name.

Of note, in this scenario the application deployer or administrator is able to decide which files are allowed to be written. For example, for code source "/FileWriteOperationAll", a policy may be defined whereby write permissions to all files under the "c:/properties" directory and its subdirectories may be granted. For code source "/FileWriteOperationLimited", a policy may be defined whereby write permission to certain files are granted, e.g., where only files under the "c:/properties/limited/" directory are writable. In this manner, the development and deployment decisions as to which files can be written to are effectively separated from one another. A sample policy file, illustrating the aforementioned policies, is shown below in Table II:

TABLE II

```
grant codebase "/FileWriteOperationAll" {
    permission java.io.FilePermission "c:/properties/-", "write";
};
grant codebase "/FileWriteOperationLimited" {
    permission java.io.FilePermission "c:/properties/limited/*", "write";
};
```

For the second scenario, where JAAS authorization is to be used for class such as NoPermissionClass, the class may be put in a server1.jar JAR file, and with all permissions granted to the server1 jar code base. During runtime, the custom class loader may be used to load this NoPermissionClass, and assign a code source "/NoPermissionCodeSource". Since NoPermissionClass does not require a standard JAVA 2 security policy, the only policy defined for "NoPermissionCodeSource" may be a JAAS authorization policy that is based on the principal. An sample policy file, illustrating the aforementioned policy, is shown below in Table III:

TABLE III

```
grant codebase "c:/was/lib/server1.jar" {
    Permission java.security.AllPermission;
};
grant codebase "/NoPermissionCodeSource" principal
com.acme.principal.SamplePrincipal "fileOwner" {
    Permission com.acme.permission.WritePermission "datalog";
};
``` where only a caller having a principal com.acme.principal.SamplePrincipal has the permission to write to file datalog.

It will be appreciated that dynamic permission granting consistent with the invention may be used to implement any number of other security policies in a JAVA programming environment, often with greater flexibility and configurability than is otherwise supported in conventional environments. Therefore, the aforementioned examples are provided only for the purposes of illustration, and are not exclusive implementations of the invention in a JAVA environment.

Turning now to the Drawings, wherein like numbers denote like parts throughout the several views, FIG. 1 illustrates an exemplary apparatus 10 within which dynamic permission granting may be performed in a manner consistent with the invention. Apparatus 10 in the illustrated embodiment is implemented as a server or multi-user computer that is coupled via a network 12 to one or more client computers 14. For the purposes of the invention, each computer 10, 14 may represent practically any type of computer, computer system or other programmable electronic device. Moreover, each computer 10, 14 may be implemented using one or more networked computers, e.g., in a cluster or other distributed computing system. In the alternative, dynamic permission granting consistent with the invention may be implemented within a single computer or other programmable electronic device, e.g., a desktop computer, a laptop computer, a handheld computer, a cell phone, a set top box, etc.

Computer 10 typically includes a central processing unit 16 including at least one microprocessor coupled to a memory 18, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 18 may be considered to include memory storage physically located elsewhere in computer 10, e.g., any cache memory in a processor in CPU 16, as well as any storage capacity used as a virtual memory, e.g., as stored on a mass storage device 20 or on another computer coupled to computer 10. Computer 10 also typically receives a number of inputs and outputs for communicating information externally. For interface with a user or operator, computer 10 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 10 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface 24 with one or more networks 12 (e.g., a LAN, a WAN, a wireless network, and/or the Internet, among others) to permit the communication of information with other computers and electronic devices. It should be appreciated that computer 10 typically includes suitable analog and/or digital interfaces between CPU 16 and each of components 18, 20, 22 and 24 as is well known in the art. Other hardware environments are contemplated within the context of the invention.

Computer 10 operates under the control of an operating system 26 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to computer 10 via network 12, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Now turning to the illustrated embodiment, a runtime environment, taking the form of a JAVA Virtual Machine (JVM) 28, includes a security API, such as the JAVA 2 Platform Security API that may be used to control authorization for JAVA applications deployed in the JVM. One such JAVA application that may be deployed in JVM 28 is represented by a code base 32 (e.g., as distributed in a JAR file), which includes a plurality of classes 34. A policy file 36 is also illustrated in JVM 28, and is typically deployed along with code base 32 to provide the security policy used by security API 30 to manage authorization for code base 32.

In addition, a custom class loader 38, which optionally may itself be deployed within code base 32, is provided to dynamically set a code base identifier for classes 34 from code base 32 (and, if appropriate, from classes in other code bases in JVM 28) during class load operations. Class loader 38 is custom from the standpoint that the class loader extends an existing class loader provided by JVM 28, e.g., a secure class loader class, and thus provides the standard class loader functionality such as the ability to retrieve the byte codes for a class, set up the state of a new object or instance of the class, initiate JIT compilation or translation, etc. It will be appreciated that class loader 38 need not be a subclass of a standard class loader in other embodiments. It will also be appreciated that in other environments entities other than a designated class loader may be used to assign a code base identifier to a class during a class load operation.

Figure 2:
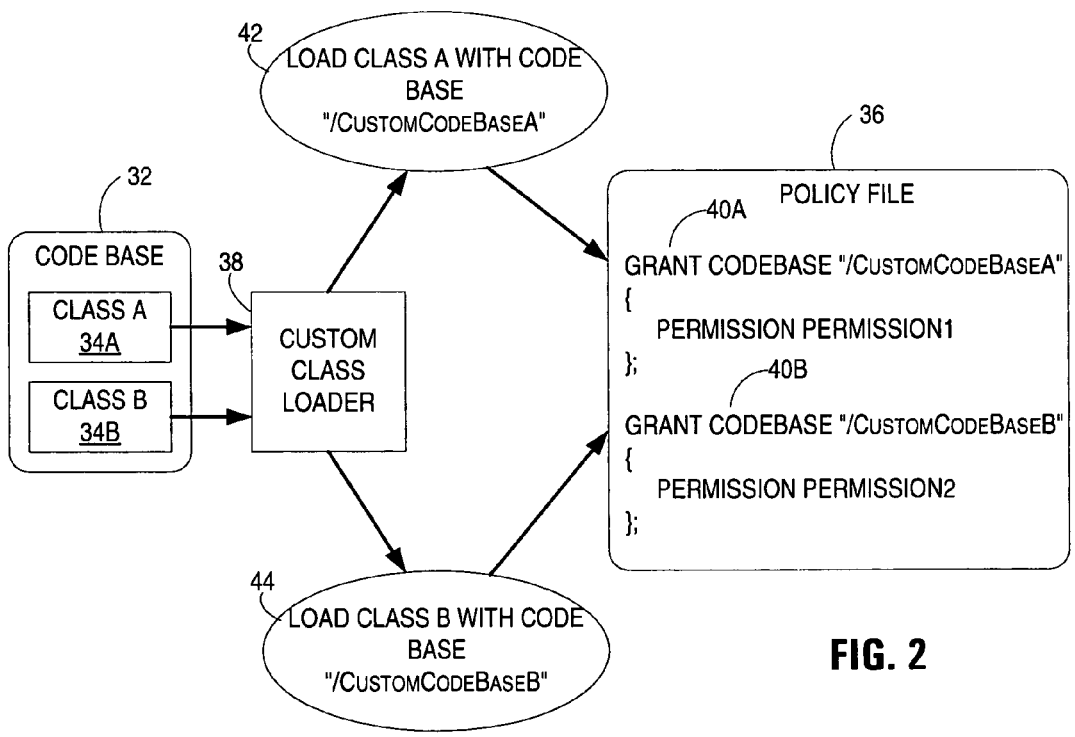
FIG. 2 is a block diagram illustrating the relationship between loaded classes and policies in the apparatus of FIG. 1.

FIG. 2, for example, illustrates in greater detail the relationships between code base 32, custom class loader 38, and policy file 36. In particular, FIG. 2 illustrates within code base 32 a pair of classes (class A and class B) 34A and 34B, along with a policy file 36 with a pair of policies 40A and 40B respectively associated with code bases "/CustomCodeBaseA" and "/CustomCodeBaseB".

During a class load of class 34A, represented by block 42, custom class loader 38 associates class 34A with the code base identifier "/CustomCodeBaseA", which in turn associates the class with policy 40A by virtue of the code base identifier. As a result, policy 40A will be used for class 34A, and class 34A will effectively be granted "Permission1" from the policy.

Likewise, during a class load of class 34B, represented by block 44, custom class loader 38 associates class 34B with the code base identifier "/CustomCodeBaseB", which in turn associates the class with policy 40B by virtue of the code base identifier. As a result, policy 40B will be used for class 34B, and class 34B will effectively be granted "Permission2" from the policy.

One suitable JAVA implementation for dynamically assigning a code base identifier to a class during a class load operation is illustrated by the sequence diagram of FIG. 3. In particular, FIG. 3 illustrates steps designated A1-A8 in connection with creating a first instance of a "class1" class on behalf of an application 50.

At step A1, application 50 requests a new object instance from an objectCreator object 52 by invoking a newObject method on the objectCreator object, specifying the class ("class1") and code base identifier to be applied to that class ("csName1"). Then, in step A2, objectCreator object 52 invokes a loadClass method on a customClassLoader object 54, specifying the same class and code base identifier therefor.

Next, in steps A3 and A4, standard class load operations are performed to load the byte codes for the class into the JVM. Specifically, in step A3, customClassLoader object 54 opens a resource stream for loading the class file for the class, and in step A4, customClassLoader object 54 loads the byte codes from the class file into a byte array B via the opened resource stream.

Next, in step A5, customClassLoader object 54 creases a new codeSource object 56 for the code base identifier "csName1". Next, in step A6, customClassLoader object 54 creates a class object 58 for the class1 class by invoking a defineClass method specifying the class name ("class1"), byte array ("B"), offset ("0"), and length ("LEN"). Furthermore, the invocation of the defineClass method references codeSource object 56 as the protection domain for the class, thus associating class object 58 with the desired code base identifier, typically via storing the code base identifier in a private field in the class object.

Next, in steps A7 and A8, an instance ("object1") of the class1 class is created in a conventional manner. In particular, in step A7, objectCreator object 52 requests from class1 object 58 a new instance of the class1 class, and in step A8, class1 object 58 invokes a createOperation method to create an object1 object 60, with a reference to the newly created instance ultimately returned to application 50.

Once an instance of the class1 class is returned to application 50, any access controlled operations performed by the instance may be controlled via conventional JAVA 2 security access checking, as the code base identifier associated with the class and all of its instances will identify a specific code base for which a policy is defined in a deployed policy file. FIG. 4, for example, illustrates an access check routine 70 that may be implemented in a JVM to perform an access check for an object attempting to perform an access controlled action.

Routine 70 begins in block 72 by accessing the policy associated with the code base specified by the code base identifier for the class of the object performing the action to determine the access permission(s) for the class instance. Block 74 then determines if the action is authorized based upon the policy, and based upon this determination, block 76 terminates the routine, returning a grant or deny indication that indicates whether the action is authorized.

While a custom class loader may be implemented in a number of manners consistent with the invention, Table IV below illustrates one suitable implementation of a JAVA source code representation of custom class loader 54 of FIG. 3, which may be defined as a subclass of the SecureClass- Loader class supported by JAVA 2 security, and which may be used to dynamically assign a code source name to a class during a class load operation:

TABLE IV

```
public final class CustomClassLoader extends SecureClassLoader {
    Class loadClass(String resourceStreamClassName, String
        className, String
    codeSourceName) {
        InputStream is =
            getResourceAsStream(resourceStreamClassName);
        byte b[ ] = null;
        int len = 0;
        byte[ ] buffer = new byte[8192];
        ByteArrayOutputStream baos = new
            ByteArrayOutputStream(2048);
        int n;
        baos.reset( );
        while ((n = is.read(buffer, 0, buffer.length)) != −1) {
            baos.write(buffer, 0, n);
        }
        b = baos.toByteArray( );
        len = b.length;
        CodeSource cs = new CodeSource(new URL("http",
            "www.acme.com",
        codeSourceName), (Certificate[ ]) null);
        theClass = defineClass(className, b, 0, len, cs);
        return theClass;
    }
}
```

For user code to instantiate a class FileOperation using the aforementioned custom class loader, instead of calling the default class loader via a "new FileOperation( )" call, the class may be loaded and instantiated via the call shown in Table V below:

TABLE V

```
FileOperation op =
    ObjectCreator.newObject("com/acme/FileOperation",
    "com.acme.FileOperation", "/CustomCodeSource1");
```

The ObjectCreator.newObject method may, in turn, be implemented as shown in Table VI below:

TABLE VI

```
// Get an instance of CustomClassLoader
CustomClassLoader classLoader = CustomClassLoader.getSingleton( );
Class fileOperationClass =
classLoader.loadClass("com/acme/FileOperation",
    "com.acme.FileOperation", "/CustomCodeSource1");
FileOperation op = (FileOperation) fileOperationClass.newInstance( );
```

As a result of the instantiation of the FileOperation class, the code source name associated with the FileOperation class is "http://www.acme.com/CustomCodeSource1." Consequently, a policy file having a policy for the CustomCodeSource1 code base identifier will be used during access checking to define the permissions granted to instances of the FileOperation class.

It will be appreciated that with the framework provided herein, a custom class loader consistent with the invention may dynamically assign code base identifiers to classes, thus enabling a decision of what policy to apply to a class to be made either at deployment time, or even at runtime. In this regard, a custom class loader may be configured to check a configuration parameter when determining what code base identifier should be assigned to a class. The configuration parameter may be established, for example, in a configuration file (e.g., an XML file deployed with the code base), via a system configuration parameter set by a deployer or administrator prior to runtime, or even via programmatically determined parameter.

Various additional modifications to the herein-described embodiments will be apparent to one of ordinary skill in the art having the benefit of the instant disclosure. Therefore, the invention lies in the claims hereinafter appended.

What is claimed is:

1. A method of executing object-oriented program code defined in a code base identified by a first code base identifier, the method comprising:

during a class load of a class defined in the code base for the object-oriented program code, assigning a second code base identifier to the class that differs from the first code base identifier for the code base within which the class is defined; and using a security architecture that relies on code base-correlated policies, determining an access permission for an instance of the class by accessing a policy associated with the second code base identifier, wherein assigning the second code base identifier to the class grants a different access permission to the class than that granted to at least one other class defined in the code base and having assigned thereto a different code base identifier from the second code base identifier, and wherein assigning the second code base identifier to the class causes the security architecture to use the second code base identifier to access the policy as a code-based correlated policy correlated to the second code base identifier;

wherein the object-oriented program code comprises a collection of JAVA classes disposed in a Java Archive file (JAR) and forming the code base disposed in the JAR file, wherein the class being loaded is one of the collection forming the code base disposed in the JAR file, wherein the JAR file includes the class loader for loading the class and the class being loaded is a first class and the policy is a first policy, the JAR file further including a code base identifier for at least one other class defined in the collection forming the code base disposed in the JAR file for identifying the JAR file, wherein the first policy is disposed in a policy file, the policy file further including a second policy defining an access permission for the at least one other class defined in the collection forming the code base disposed in the JAR file, and wherein the first policy defines an access permission for the first class that is more restrictive than the access permission defined by the second policy.

2. The method of claim 1, further comprising:

during a class load of a second class defined in the code base, assigning a third code base identifier to the second class that differs from the second code base identifier for the first class; and determining an access permission for an instance of the second class by accessing a third policy associated with the third code base identifier.

3. The method of claim 1, further comprising accessing a parameter in association with the class load, wherein assigning the second code base identifier to the first class is based upon the parameter.

4. The method of claim 3, wherein assigning the second code base identifier to the first class is performed by the class loader, and wherein the parameter is specified in a call to the class loader.

5. The method of claim 3, wherein the parameter is specified in a configuration file.

6. The method of claim 1, wherein the first policy is defined in association with deploying the object-oriented program code.

7. The method of claim 1, wherein the first policy defines a principal-based access permission for the first class that is more restrictive than the access permission defined by the second policy.

8. The method of claim 1, wherein assigning the second code base identifier to the first class is performed by the class loader defined in the code base.

9. The method of claim 1, wherein determining the access permission for the instance of the first class is performed by an API function configured to determine access permissions by accessing code base-correlated policies.

10. A method of deploying a JAVA program, the method comprising:
  deploying a JAVA Archive (JAR) file, the JAR file including a class and a class loader that is configured to assign a code base identifier to the class that is different from that of the JAR file when loading the class; and
  deploying a policy file, the policy file including a policy associated with the code base identifier for the class such that the access permission granted to the class differs from that of the at least one other class in the JAR file and such that a JAVA security architecture that relies on code base-correlated policies may be used to determine an access permission for the class that differs from the at least one other class by accessing a code base-correlated policy associated with the code base identifier assigned to the class;
  wherein the class being deployed is a first class among a collection of JAVA classes forming the code base disposed in the JAR file, wherein the code base identifier assigned to the first class is a first code base identifier, and the policy is a first policy, the JAR file further including a second code base identifier for at least one other class defined in the collection forming the code base disposed in the JAR file for identifying the JAR file, wherein the at least one other class includes a second class associated with the second code base identifier, wherein the class loader is configured to assign the first code base identifier to the first class when loading the first class, wherein the policy file includes a second policy associated with the second code base identifier such that the first and second classes have different access permissions granted thereto, and wherein the first policy defines an access permission for the first class that is more restrictive than the access permission defined by the second policy associated with loading the second class.

11. The method of claim 10, wherein the class loader is configured to assign the first code base identifier to the first class responsive to a parameter determined during loading of the first class.

12. The method of claim 11, wherein the parameter is specified in a call to the class loader.

13. The method of claim 11, wherein the parameter is specified in a configuration file.

14. An apparatus for executing object-oriented program code defined in a code base identified by a first code base identifier, comprising:
  at least one processor; and
  program code configured to be executed by the at least one processor to load a class defined in a code base identified by a first code base identifier, and while loading the class, assign a second code base identifier to the class that differs from the first code base identifier for the code base within which the class is defined, wherein the second code base identifier is associated with a policy that defines an access permission for the class such that a security architecture that relies on code base-correlated policies may be used to determine an access permission for the class by accessing the policy associated with the second code base identifier, and such that assignment of the second code base identifier to the class grants a different access permission to the class than that granted to at least one other class defined in the code base and having assigned thereto a different code base identifier from the second code base identifier and causes the security architecture to use the second code base identifier to access the policy as a code-based correlated policy correlated to the second code base identifier;
  wherein the object-oriented program code comprises a collection of JAVA classes disposed in a Java Archive file (JAR) and forming the code base disposed in the JAR file, wherein the class being loaded is one of the collection forming the code base disposed in the JAR file, wherein the JAR file includes the class loader for loading the class and the class being loaded is a first class and the policy is a first policy, the JAR file further including a code base identifier for at least one other class defined in the collection forming the code base disposed in the JAR file for identifying the JAR file, wherein the first policy is disposed in a policy file, the policy file further including a second policy defining an access permission for the at least one other class defined in the collection forming the code base disposed in the JAR file, and wherein the first policy defines an access permission for the first class that is more restrictive than the access permission defined by the second policy.

15. The apparatus of claim 14, wherein the program code is further configured to determine an access permission for an instance of the first class by accessing the first policy associated with the second code base identifier.

16. The apparatus of claim 15, wherein the class loader assigns the second code base identifier to the first class based upon a parameter, wherein the parameter is specified in a call to the class loader or in a configuration file.

17. The apparatus of claim 14, wherein the first policy is defined in association with deploying the object-oriented program code.

18. The apparatus of claim 14, wherein the first policy defines a principal-based access permission for the first class that is more restrictive than the access permission defined by the second policy.

19. A program product for executing object-oriented program code defined in a code base identified by a first code base identifier, comprising:
  program code configured to load a class defined in a code base identified by a first code base identifier, and while loading the class, assign a second code base identifier to the class that differs from the first code base identifier for the code base within which the class is defined, wherein the second code base identifier is associated with a policy that defines an access permission for the class such that a security architecture that relies on code base-correlated policies may be used to determine an access permission for the class by accessing the policy associated with the second code base identifier, and such that assignment of the second code base identifier to the class grants a different access permission to the class than that granted to at least one other class defined in the code base and having assigned thereto a different code base identifier from the second code base identifier and causes the security architecture to use the second code base identifier to access the policy as a code-based correlated policy correlated to the second code base identifier; and a computer readable medium bearing the program code; wherein the object-oriented program code comprises a collection of JAVA classes disposed in a Java Archive file (JAR) and forming the code base disposed in the JAR file, wherein the class being loaded is one of the collection forming the code base disposed in the JAR file, wherein the JAR file includes the class loader for loading the class and the class being loaded is a first class and the policy is a first policy, the JAR file further including a code base identifier for at least one other class defined in the collection forming the code base disposed in the JAR file for identifying the JAR file, wherein the first policy is disposed in a policy file, the policy file further including a second policy defining an access permission for the at least one other class defined in the collection forming the code base disposed in the JAR file, and wherein the first policy defines an access permission for the first class that is more restrictive than the access permission defined by the second policy.

20. The program product of claim 19, wherein the program code is further configured to determine an access permission for an instance of the first class by accessing the first policy associated with the second code base identifier.

* * * * *